United States Patent [19]

Koyachi et al.

[11] Patent Number: 5,484,031
[45] Date of Patent: Jan. 16, 1996

[54] LEG STRUCTURE FOR WALKING ROBOT

[75] Inventors: Noriho Koyachi, Tsukuba; Hironori Adachi, Tsuchiura; Tatsuo Arai, Tsukuba, all of Japan

[73] Assignees: Agency of Industrial Science and Technology; Ministry of International Trade and Industry, both of Tokyo, Japan

[21] Appl. No.: 314,284

[22] Filed: Sep. 30, 1994

[30] Foreign Application Priority Data

Sep. 30, 1993 [JP] Japan .................... 5-268176

[51] Int. Cl.$^6$ .................... B62D 57/02
[52] U.S. Cl. .................... 180/8.1; 180/8.6
[58] Field of Search .................... 180/8.1, 8.6

[56] References Cited

U.S. PATENT DOCUMENTS 4,502,556  3/1985  Bartholet .................... 180/8.6
5,121,805  6/1992  Collie .................... 180/8.1

FOREIGN PATENT DOCUMENTS 2686564  7/1993  France .................... 180/8.1

*Primary Examiner*—Mitchell J. Hill
*Attorney, Agent, or Firm*—Oblon, Spivak, McClelland, Maier, & Neustadt

[57] ABSTRACT

A leg structure for a walking robot includes first and second input links rotatably attached to a robot body, a connecting link connected with the second input link at a point whose position can be varied, and an output link connected at one end with the distal end of the connecting link and connected at an intermediate point thereof with the first input link. When the leg structure is to be converted for use as an arm mechanism, the connecting link and the output link are passed beyond the singular point where they lie on a straight line, whereby the angle between the connecting link and the output link moves through the 180° boundary between the leg and arm operating states and the driving mode of the output link is changed from low speed and high torque to high speed and low torque.

2 Claims, 4 Drawing Sheets

1

LEG STRUCTURE FOR WALKING ROBOT

BACKGROUND OF THE INVENTION

1. Field of the Invention

This invention relates to a leg structure for a walking robot, more particularly to a leg structure for a walking robot which enables the leg of a robot to be converted for use as an arm for conducting various tasks such as grasping, conveying and transporting objects.

2. Description of the Prior Art

Parallel links are commonly used in the leg mechanisms and arm (manipulator) mechanisms of prior art robots. When arms and legs employing parallel links are used, it is necessary to configure them so as to prevent them from making contact with the robot body or other robot mechanisms during their operation.

Moreover, since the legs of a walking robot are required to support the robot's body weight, they must be able to produce a large downward force. Therefore, when an arm mechanism and a leg mechanism are driven by actuators having the same output (power) the leg mechanism actuator has to be set to lower speed and higher torque. As this makes it difficult to design interchangeable arm and leg mechanisms, the mechanisms of a robot with both arms and legs have to be provided individually.

This invention was accomplished in response to the foregoing circumstances and has as its object to provide a leg structure for a walking robot which through simple means can be converted for use in conducting arm-related tasks requiring high speed and low torque.

SUMMARY OF THE INVENTION

For achieving the aforesaid object, this invention provides a leg structure for a walking robot comprising a first input link rotatably attached to a robot body, a second input link rotatably attached to the robot body at the same location as the first input link to extend upward, a connecting link connected at one end with the second input link, an output link connected at one end with the other end of the connecting link and connected at an intermediate point thereof with the distal end of the first input link, and adjusting means for adjusting the distance between the point where the second input link connects with the connecting link and the robot body, the leg structure switching from one state to another on opposite sides of a singular point where the connecting link and the output link lie on a straight line and the angle therebetween is 180°.

When this leg structure is used as a leg, it functions as an ordinary closed link in which one or both of the first and second input links are driven for moving the end-point of the output link as required for locomotion of the walking robot. Since in this case the point of connection between the connecting link and the second input link is maintained close to the robot body, the output link is driven at low speed and high torque so as to enable the leg to produce a large force for supporting the weight of the robot.

When the leg structure is converted for use as an arm, the connecting link and the output link are passed beyond the singular point where they lie on a straight line and the point of connection between the connecting link and the second input link is simultaneously moved toward the distal end of the second input link. As a result, the angle between the connecting link and the output link moves through the 180° boundary between the leg and arm operating states so that the tip of the output link is positioned in a work space above the robot body. In addition, the change in the position of the connection between the connecting link and the second input link causes the output link to be driven at high speed and low torque as is appropriate for grasping, conveying and transporting objects and other such arm operations.

Thus by the simple means of varying the position of the connection between the connecting link and the second input link, the leg structure is able to convert itself from a leg mechanism driven at low speed and high torque as required for locomotion to an arm mechanism driven at high speed and low torque as required for arm-related tasks. The leg structure therefore enables simplification of the walking robot mechanism, eliminates the need for separately providing a walking robot with an arm or arms, and makes it unnecessary to implement measures for avoiding contact between legs and arms.

The above and other objects, characteristic features and advantages of this invention will become apparent to those skilled in the art from the description of the invention given hereinbelow with reference to the accompanying drawings.

DESCRIPTION OF THE PREFERRED EMBODIMENT

Figure 1:
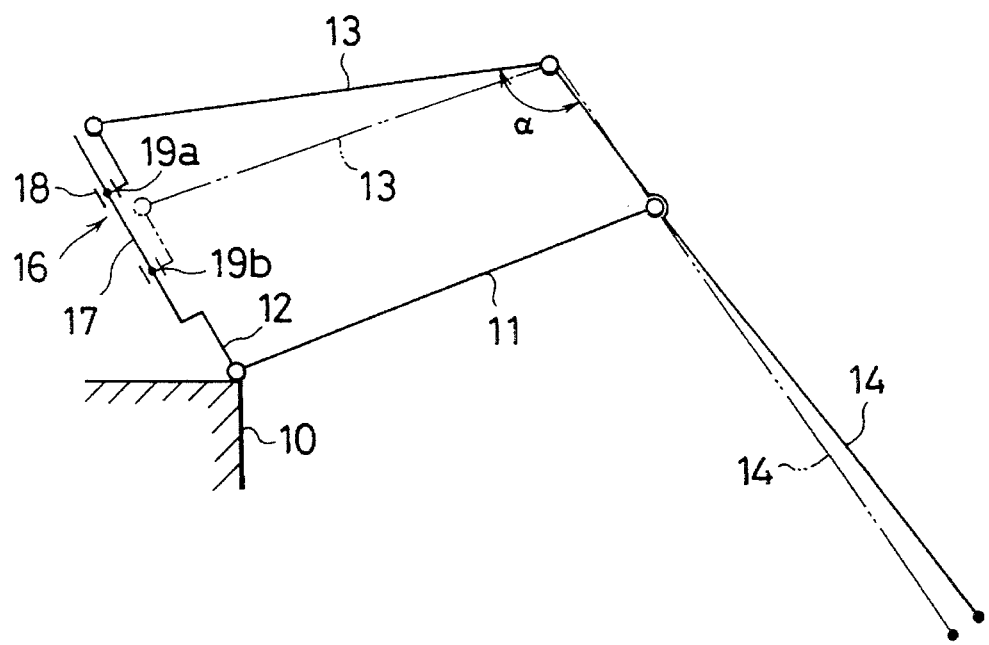
FIG. 1 is a schematic view showing the leg structure for a walking robot according to this invention functioning as a leg.
Figure 2:
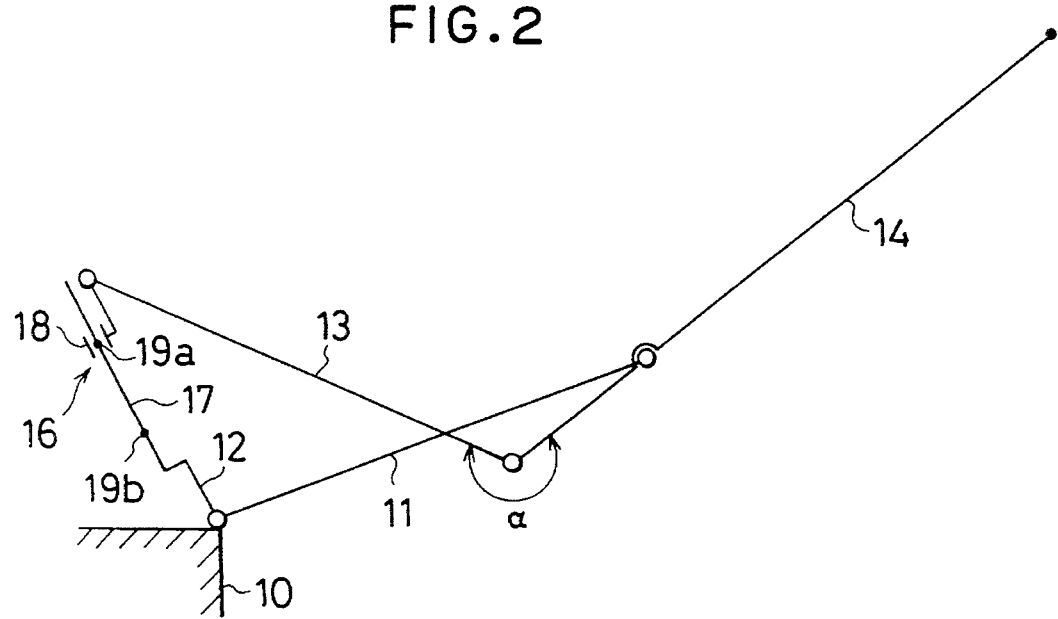
FIG. 2 is a schematic view showing the leg structure of FIG. 1 functioning as an arm.

An embodiment of the leg structure for a walking robot according to this invention is shown in FIGS. 1 and 2. This leg structure is fundamentally one for provision on a multi-legged robot for enabling locomotion.

As shown in FIG. 1, the leg structure comprises a first input link 11 rotatably attached to a robot body 10, a second input link 12 rotatably attached to the robot body 10 at the same location as the first input link 11 to extend upward and form a prescribed angle relative to the first input link 11, a connecting link 13 connected at one end with the second input link 12 and an output link 14 connected at one end with the other end of the connecting link 13 and connected at an intermediate point thereof with the distal end of the first input link 11. The leg structure is further provided on the second input link 12 with an adjustment mechanism 16 for adjusting the distance between the point where the second input link 12 connects with the connecting link 13 and the robot body 10.

The adjustment mechanism 16 is for changing the length of the second input link 12 so as to switch the leg structure from the low speed and high torque characteristics it requires to fulfill its basic function as a leg mechanism to high speed and low torque characteristics for adapting it to the performance of arm-related tasks. As shown by the chain line in FIG. 1, when the leg structure is used as a leg mechanism for outputting low speed and high torque to the leg end-point, the point of connection between the connecting link 13 and the second input link 12 is moved to a position 19b closer to the robot body 10 so that the links 11–14 are connected in the shape of a parallelogram. On the other hand, when it is used to perform the tasks of an arm at high speed and low torque, the point of connection between the connecting link 13 and the second input link 12 is moved to a position 19a closer to the distal end of the second input link 12, as shown by the solid lines in FIG. 1. The connection point on the second input link 12 can be set at an appropriate intermediate position as required for producing the required output torque.

The adjustment mechanism 16 for adjusting the connection point of the connecting link 13 with the second input link 12 can be constituted by a screw 17 and a threaded member 18 connected with one end of the connecting link 13 and engaged with the screw 17 so as to move along the screw 17 as the screw 17 is rotated. The mechanism is not limited to this configuration, however, and various other arrangements for varying the link length are also usable.

Although not shown in the drawings, the robot body 10 is equipped with drive devices for rotating the first and second input links 11, 12. These drive devices, which are provided separately for the first and second input links 11, 12, are disposed within the plane including the links 11–14. All connections between the links 11–14 are established so as to permit rotation within the same plane. As a result, the tip (end-point) of the output link 14 can be moved to desired positions within the aforesaid plane by the drive devices under the control of a control device (not shown). The movement of the leg can therefore be controlled as required for locomotion.

The aforesaid leg is configured such that it is converted from a leg to an arm when, as shown in FIG. 2, the connecting link 13 and the output link 14 pass through the geometric singular point where they lie on a straight line, i.e., when the angle $\alpha$ between the connecting link 13 and the output link 14 becomes larger than 180°. Since an arm is used at high speed and low torque, the connection between the connecting link 13 and the second input link 12 is in this case ordinarily moved to and maintained at the position 19a on the second input link 12 in the manner explained earlier.

When the aforesaid leg structure is used as a leg, it functions as an ordinary closed link in which one or both of the first and second input links 11, 12 are driven for moving the end of the output link 14 as required for locomotion of the walking robot. Since in this case the point of connection between the connecting link 13 and the second input link 12 is maintained at the position 19b on the side of the robot body 10, the output link 14 is driven at low speed and high torque, whereby the leg can produce a large force for supporting the weight of the robot.

When the leg structure is converted for use as an arm, the connecting link 13 and the output link 14 are passed beyond the singular point where they lie on a straight line and the adjustment mechanism 16 simultaneously moves the point of connection between the connecting link 13 and the second input link 12 at the position 19a. As a result, the angle between the connecting link 13 and the output link 14 moves through the 180° boundary between the leg and arm operating states and the ratio of speed transmission to the output link 14 changes so as to drive the output link 14 at high speed and low torque as is appropriate for grasping, conveying and transporting objects and other such arm operations.

For causing the angle $\alpha$ between the connecting link 13 and the output link 14 to pass through the transition point, the second input link 12 is rotated counterclockwise about its point of attachment to the robot body 10 as viewed in FIG. 1 until the connecting link 13 and the output link 14 have come to lie on a straight line, whereafter the second input link 12 is rotated clockwise. In this case, it may happen that the connecting link 13 and the output link 14 do not pass through the transition point but instead return to their original state. This problem can be overcome, for example, by providing a magnetic clutch or other such return prevention means at the connection point between the connecting link 13 and the output link 14 or by moving the connecting link 13 and the output link 14 through the transition point with the end-point of the output link 14 pressed against the ground or another leg.

Figure 3:
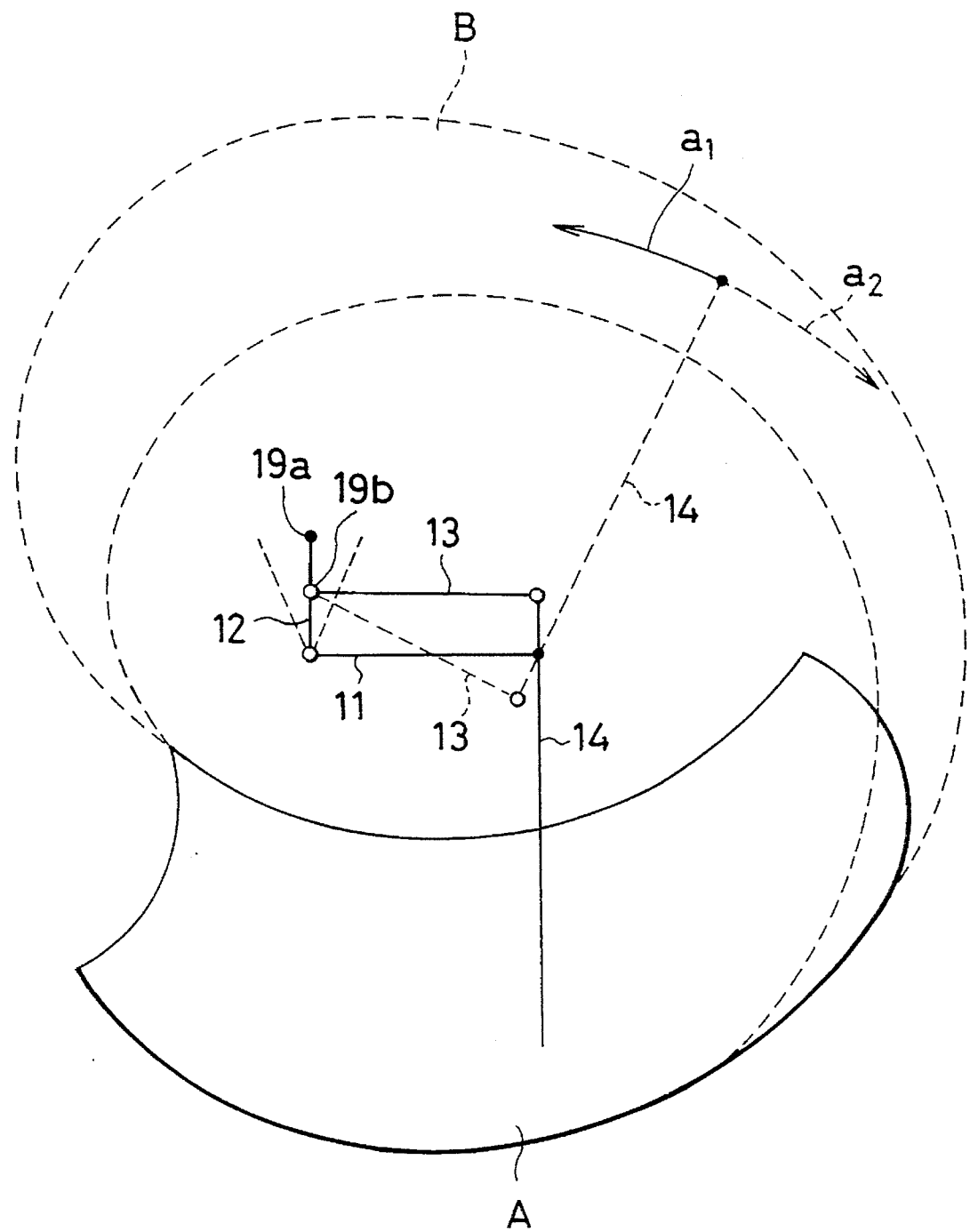
FIG. 3 is a diagram showing the leg end-point work space when the link of the leg structure of FIG. 1 is configured as a parallelogram.

FIG. 3 shows the work space A of the tip (end-point) of the output link 14 when, with the connection point of the connecting link 13 with the second input link 12 at position 19b and the links 11–14 arranged in parallelogram configuration, the leg structure is operated as an ordinary leg (in the state of the leg structure shown in solid lines) with the first input link 11 swung ±60° from the horizontal and the second input link 12 swung ±60° from the vertical; the work space B of the tip (end-point) of the output link 14 (for comparison with FIG. 4) when an identically configured leg structure is operated as an arm (in the state of the leg structure shown in broken lines) under the same conditions; and the operating loci $a_1$, $a_2$ of the tip of the output link 14 in the same case when the second input link 12 is swung ±15° from the vertical.

Figure 4:
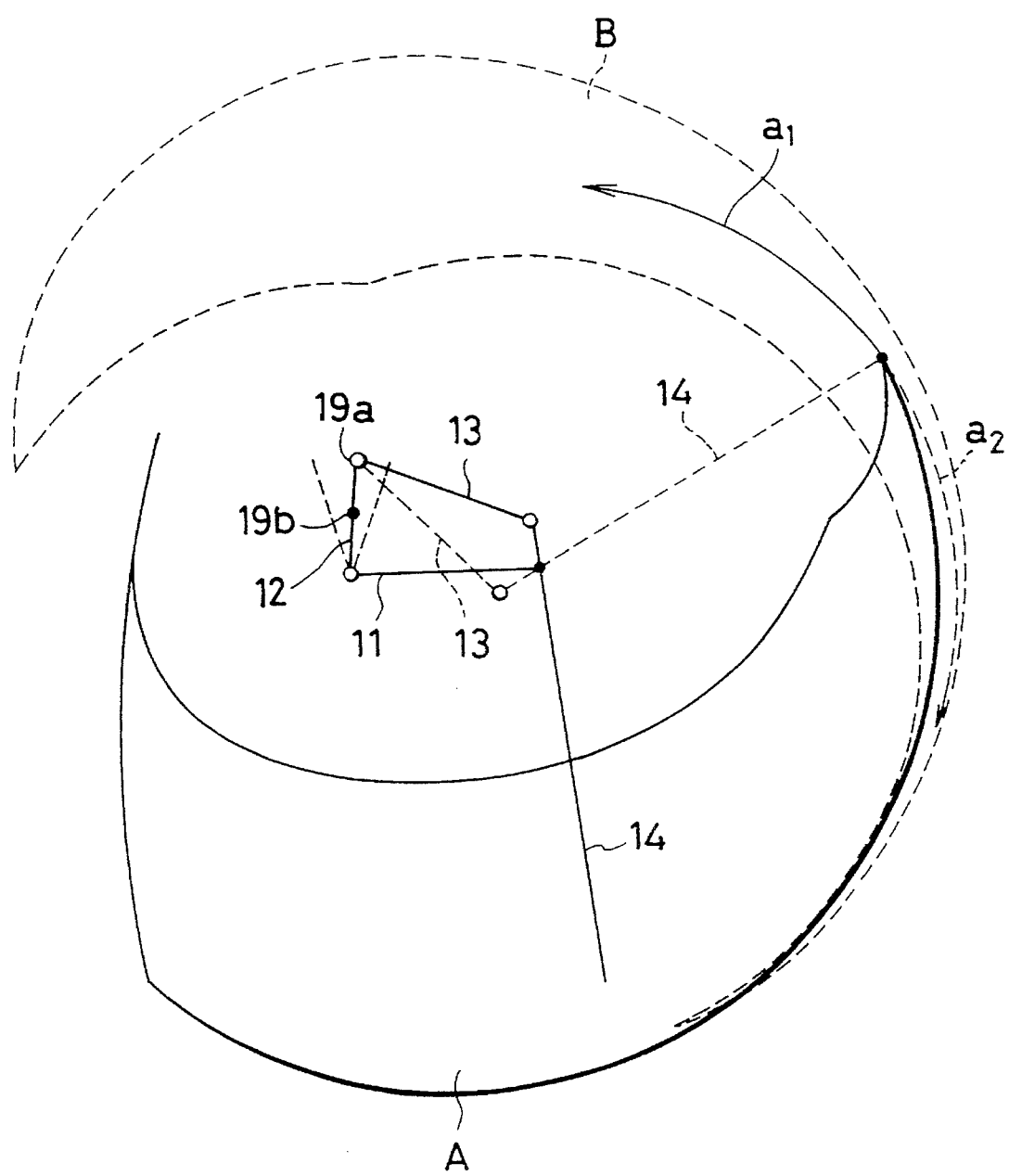
FIG. 4 is a diagram showing the leg end-point work space when the length of the second input link of the leg structure of FIG. 1 is extended so that the link is not configured as a parallelogram.

FIG. 4 shows the work space A of the tip (end-point) of the output link 14 when, with the connection point of the connecting link 13 with the second input link 12 at a position 19a twice as distant from the robot body 10 as the position 19b in FIG. 3 and the links 11–14 arranged in a non-parallelogram configuration, the leg structure is, as in the case of FIG. 3, operated as an ordinary leg (in the state of the leg structure shown in solid lines) with the first input link 11 and second input link 12 swung ±60°; the work space B of the tip (end-point) of the output link 14 when an identically configured leg structure is operated as an arm (in the state of the leg structure shown in broken lines) under the same conditions; and the operating loci $a_1$, $a_2$ of the tip of the output link 14 in the same case when the second input link 12 is swung ±15° from the vertical.

As is clear from a comparison of FIGS. 3 and 4, the operating loci $a_1$, $a_2$ of the tip of the output link 14 produced by swinging the second input link 12 by ±15° were longer in the case of FIG. 4, i.e. in the case where the distance to the connection point on the second input link 12 was doubled from that in FIG. 3 and the links 11–14 were in a non-parallelogram configuration. This means that under the conditions of FIG. 4 the output link 14 was driven at high speed and low torque so that a large work space could be obtained for the tip of the output link 14 even at a small rotation angle of the input links 11, 12.

Figure 5:
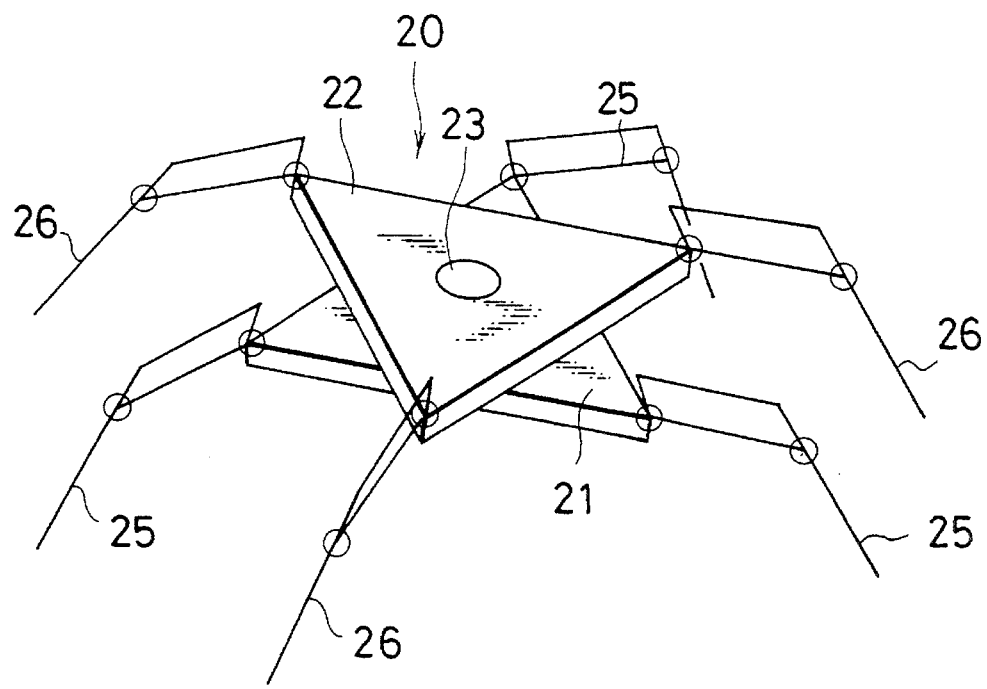
FIG. 5 is a schematic perspective view showing a multi-legged robot using a plurality of the leg structures of FIG. 1.
Figure 6:
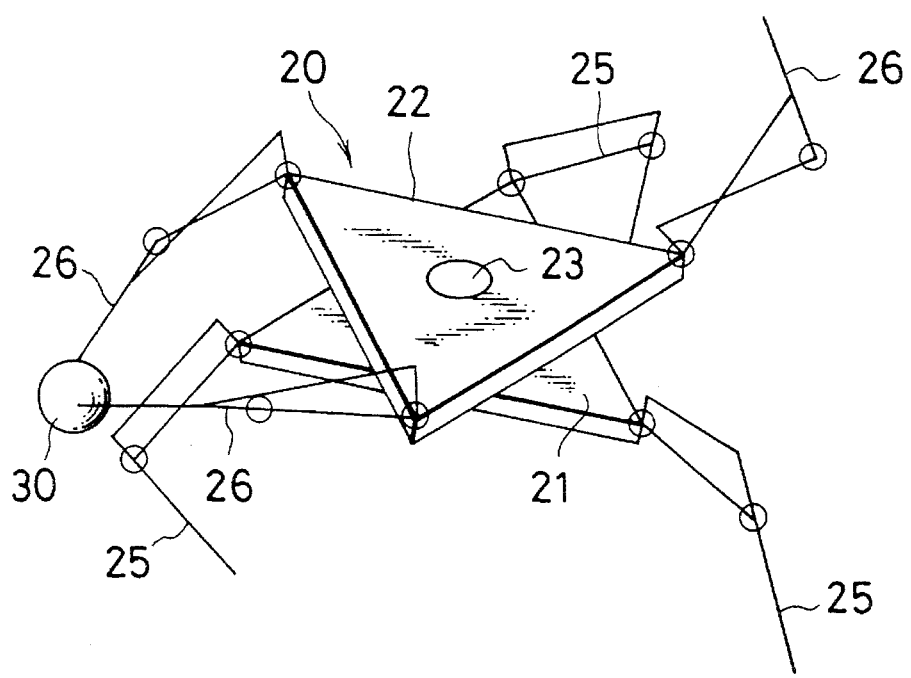
FIG. 6 is a schematic perspective view showing the robot of FIG. 5 being used to grasp an object.

FIGS. 5 and 6 show an example of a walking robot employing a plurality of the aforesaid leg structures. The illustrated multi-legged robot has a walking robot body 20 consisting of a lower leg stage 21 and a rotary stage 22 mounted to be rotatable about a pivot 23 at the center of the lower leg stage 21. Three legs 25 of ordinary configuration are attached to the leg stage 21 to be driven for locomotion and three legs 26 configured according to this invention to be also capable of functioning as arms are attached to the rotary stage 22.

While the legs 26 can be used for locomotion together with the legs 25 as shown in FIG. 5, they can also be used as arms for holding an object 30 as shown in FIG. 6. When a leg is to be used as an arm for lifting the object 30, the connecting link and the output link are moved beyond the geometric singular point to cause the angle therebetween to pass through the transition point, and the point of connection of the connecting link with the second input link is changed. As a result, the leg/arm is able to operate at high speed and low torque for grasping, conveying and transporting objects and performing various other arm-related tasks.

Interference between the legs 25, 26 is prevented by controlling the leg driving devices so as to avoid contact between each leg and any of the other legs, as is required for locomotion.

The tips of the legs 26 can be equipped with appropriate grasping mechanisms for grasping objects, provided that the mechanisms are mounted in a manner that does not hinder the leg function. Moreover, for enabling two legs 26 to hold an object therebetween, it is necessary to provide a leg driving device for horizontal rotation at the point where each of the legs 26 is attached to the rotary stage 22.

According to the leg structure of this invention, by changing the position of the connection between the connecting link and the second input link the leg is able to convert itself from a leg mechanism driven at low speed and high torque as required for locomotion to an arm mechanism driven at high speed and low torque as required for arm-related tasks. The leg structure therefore enables simplification of the walking robot mechanism, eliminates the need for separately providing a walking robot with an arm or arms, and simplifies or eliminates the need for measures for preventing contact between legs and arms.

As explained in the foregoing, the present invention enables a leg structure constituted as a parallel closed link for providing the low speed and high torque required for locomotion to be converted by a simple means for use in arm-related tasks requiring high speed and low torque. As such, it makes it possible to simplify the walking robot mechanism, eliminates the need for separately providing the walking robot with arms (manipulators) and obviates the need for implementing measures for avoiding contact between legs and arms.

What is claimed is:

1. A leg structure for a walking robot having a robot body, the leg structure comprising:

a first input link having a distal end and rotatably attached to the robot body;

a second input link having two ends and rotatably attached to the robot body at the same location as the first input link to form a prescribed angle relative to the first input link;

a connecting link having two ends and connected at one of the two ends with the second input link;

an output link having two ends, the output link being connected at one of the two ends with the other of the two ends of the connecting link and connected at an intermediate point thereof with the distal end of the first input link, the first input link, the second input link, the connecting link and the output link forming a parallelogrammatic shape with an angle of not more than 180° at the connection between the connecting link and the output link when serving as legs of the robot and, when the first input link, the second input link, the connecting link and the output link serve as arms of the robot, the connecting link and the output link form an angle of not less than 180° at the connection therebetween, with the connection between the connecting link and the output link being located below the first input link; and adjusting means for adjusting the distance between the robot body and a point of connection between the second input link and the connecting link.

2. A leg structure according to claim 1, wherein the adjusting means comprises a rotatable screw provided on the second input link and a threaded member provided on the connecting link and engaged with the screw to move along the screw as the screw is rotated.

\* \* \* \* \*

UNITED STATES PATENT AND TRADEMARK OFFICE
CERTIFICATE OF CORRECTION

PATENT NO. : 5,484,031
DATED : Jan. 16, 1996
INVENTOR(S) : Noriho KOYACHI, et al.

It is certified that error appears in the above-indentified patent and that said Letters Patent is hereby corrected as shown below:

On the title page, Item [73], the Assignee, should read:

--Agency of Industrial Science and Technology,
  Ministry of International Trade and Industry,
  of Tokyo, Japan--

Signed and Sealed this

Thirtieth Day of April, 1996

Attest:

BRUCE LEHMAN

*Attesting Officer*  *Commissioner of Patents and Trademarks*